US010928227B2

(12) United States Patent
Robinson et al.

(10) Patent No.: US 10,928,227 B2
(45) Date of Patent: Feb. 23, 2021

(54) MOUNTING SYSTEM FOR MOUNTING A SENSOR ASSEMBLY

(71) Applicant: Caterpillar Inc., Deerfield, IL (US)

(72) Inventors: Mark A Robinson, Davis Junction, IL (US); Brian Ulrich, Palatine, IL (US); Jeffrey Kent Berry, Yorkville, IL (US); Shaun Randall Melchiori, Naperville, IL (US); Beau James Berning, Oswego, IL (US); Scott Allen Pozzie, Yorkville, IL (US); Travis Parker, Bloomington, MN (US)

(73) Assignee: Caterpillar Inc., Peoria, IL (US)

( * ) Notice: Subject to any disclaimer, the term of this patent is extended or adjusted under 35 U.S.C. 154(b) by 24 days.

(21) Appl. No.: 16/383,790

(22) Filed: Apr. 15, 2019

(65) Prior Publication Data

US 2020/0326213 A1 Oct. 15, 2020

(51) Int. Cl.
*G01D 11/30* (2006.01)
*G01B 7/012* (2006.01)

(52) U.S. Cl.
CPC ............. *G01D 11/30* (2013.01); *G01B 7/012* (2013.01)

(58) Field of Classification Search
CPC .... G01D 5/145; G01D 5/2033; G01D 11/245; G01D 11/30; B62D 53/005; B62D 53/021
See application file for complete search history.

(56) References Cited

U.S. PATENT DOCUMENTS

| 4,405,143 A | * | 9/1983 | Rosenkrands | ........... B60D 5/00 105/18 |
| 4,453,614 A | * | 6/1984 | Allen | ..................... B62D 53/02 180/420 |
| 4,696,486 A | | 9/1987 | Ruhter | |
| 5,107,932 A | | 4/1992 | Zachman et al. | |
| 5,332,247 A | * | 7/1994 | Etherington | ............. B60D 5/00 280/400 |
| 5,873,431 A | * | 2/1999 | Butler | .................... B62D 12/00 180/418 |
| 5,875,679 A | | 3/1999 | Salecker et al. | |

(Continued)

FOREIGN PATENT DOCUMENTS

DE 102004037959 2/2010
GB 2515900 1/2015

*Primary Examiner* — Tran M. Tran
(74) *Attorney, Agent, or Firm* — von Briesen & Roper, s.c.

(57) ABSTRACT

A mounting system for mounting a sensor assembly to a pair of rotatable members coupled by an articulation joint includes a sensor mounting plate. The sensor mounting plate is coupled to a first rotatable member and supports at least one sensor element thereon such that the at least one sensor element is in alignment with an axis of the articulation joint. The mounting system also includes a target mounting plate that is disposed in a spaced-apart manner from the sensor mounting plate. The target mounting plate has a target mounting portion for supporting the target element thereon, and a support arm extending from the target mounting portion. Further, the mounting system also includes a post having a first end configured to couple with the second rotatable member and a second end that is configured to adjustably support the support arm of the target mounting plate via an adjustment block.

19 Claims, 5 Drawing Sheets

(56) References Cited

U.S. PATENT DOCUMENTS

| | | | |
|---|---|---|---|
| 6,218,828 B1* | 4/2001 | Bates | G01D 5/145 324/207.11 |
| 6,323,643 B1* | 11/2001 | Kordecki | G01D 5/145 324/207.2 |
| 7,208,943 B2* | 4/2007 | Godoy | G01D 5/12 174/521 |
| 7,296,486 B2* | 11/2007 | Holtz | B25J 9/146 324/207.2 |
| 7,570,047 B2* | 8/2009 | Stuve | G01R 33/07 324/207.2 |
| 7,594,494 B2* | 9/2009 | Keefover | F02D 9/1065 123/337 |
| 8,008,910 B2* | 8/2011 | Booth | E05F 15/622 324/207.2 |
| 9,027,417 B2* | 5/2015 | Sato | G01L 1/04 73/862.642 |
| 9,134,200 B2* | 9/2015 | Waite | G01D 5/145 |
| 9,417,098 B2* | 8/2016 | Krishnaiah | G01D 5/145 |
| 9,482,587 B2* | 11/2016 | Masuda | G01L 1/12 |
| 9,739,640 B2* | 8/2017 | Aichriedler | G01D 5/142 |
| 9,759,540 B2* | 9/2017 | Ferrari | G01B 15/08 |
| 9,803,634 B2* | 10/2017 | May | F04B 1/303 |
| 9,827,668 B2* | 11/2017 | King | H02K 11/21 |
| 9,845,580 B2* | 12/2017 | Utterodt | E01C 19/288 |
| 9,863,793 B2 | 1/2018 | Lee | |
| 9,925,983 B2* | 3/2018 | Mitchell | E02F 9/0841 |
| 9,962,836 B2* | 5/2018 | Zunke | B25J 19/0095 |
| 10,131,380 B1* | 11/2018 | Simmons | B62D 53/021 |
| 10,184,850 B2* | 1/2019 | Quigley | B25B 21/008 |
| 10,197,146 B2* | 2/2019 | Lin | F16H 49/001 |
| 10,246,087 B2* | 4/2019 | Mitchell | B60W 30/09 |
| 10,288,458 B2* | 5/2019 | Ko | G01D 11/30 |
| 10,288,529 B2* | 5/2019 | Waite | G01D 5/145 |
| 10,415,999 B2* | 9/2019 | Aichriedler | G01R 15/20 |
| 10,456,839 B2* | 10/2019 | Nelgner | B23B 5/04 |
| 2016/0202085 A1* | 7/2016 | Rydell | G01D 5/145 324/207.2 |
| 2018/0172476 A1* | 6/2018 | Haverkamp | G01D 5/145 |
| 2018/0311795 A1* | 11/2018 | Morton | B25B 11/002 |
| 2019/0064015 A1* | 2/2019 | Wang | G01L 3/10 |
| 2020/0096419 A1* | 3/2020 | Worden | G01K 1/14 |
| 2020/0173869 A1* | 6/2020 | Negishi | G01L 3/08 |
| 2020/0326213 A1* | 10/2020 | Robinson | G01B 7/012 |

* cited by examiner

MOUNTING SYSTEM FOR MOUNTING A SENSOR ASSEMBLY

TECHNICAL FIELD

The present disclosure relates to a machine having a pair of rotatable members that are coupled by an articulation joint. More particularly, the present disclosure relates to a mounting system for mounting a sensor assembly to a pair of rotatable members that are coupled by an articulation joint.

BACKGROUND

Articulation angle sensors have been well known in the art for their use in measuring an articulation angle between a pair of rotatable members that are coupled by an articulation joint.

An example of an arrangement for mounting an articulation angle sensor to a swivel joint is disclosed in the GB Patent 2515900 (hereinafter referred to as 'the '900 patent'). However, the mounting arrangement disclosed by the '900 patent is configured for use in conjunction with an articulated bus. This renders the mounting arrangement of the '900 patent limited in use to a specific type of vehicle, that is, the articulated bus. Even otherwise, the mounting arrangement of the '900 patent may not be easily retrofitted onto existing vehicles as it consists of leveling screws that do not account for lateral tolerances when mounting components with respect to an axis of the articulation joint and therefore, a precise alignment of mounted component/s, for example, a magnetic sender and a receiver with the axis of the articulation joint may not always be possible.

Hence, an improved system is needed for mounting the articulation angle sensor to a desired machine in which the articulation angle sensor is in alignment with the axis of the articulation joint present on the machine.

SUMMARY OF THE DISCLOSURE

In an aspect of the present disclosure, a mounting system is provided for mounting a sensor assembly having a target element and at least one sensor element to a pair of rotatable members that are coupled by an articulation joint. The mounting system includes a sensor mounting plate for supporting the at least one sensor element thereon such that the at least one sensor element is in alignment with an axis of the articulation joint. The sensor mounting plate is coupled to a first rotatable member and disposed in a spaced apart manner from the articulation joint. The sensor mounting plate has a cut-out that is aligned with the axis of the articulation joint. Further, the sensor mounting plate has a set of first apertures that are spaced apart from the cut-out to correspond with a set of receptacles defined on the first rotatable member. Furthermore, the sensor mounting plate has a reference hole and a first centering hole that are located in a spaced-apart relation to the cut-out and the set of first apertures. The mounting system also includes a target mounting plate that is disposed in a spaced apart manner from the sensor mounting plate. The target mounting plate has a target mounting portion that is configured to support the target element thereon and a support arm extending from the target mounting portion. The target mounting portion has a first adjustment slot for adjustably corresponding with the reference hole of the sensor mounting plate and the support arm has a second centering hole for aligning with the first centering hole of the sensor mounting plate such that the target element is in alignment with the at least one sensor element and the axis of the articulation joint. The mounting system also includes a post that is located on a second rotatable member and disposed laterally with respect to the support arm of the target mounting plate. The post has a first end and a second end. The first end is configured to couple with the second rotatable member and the second end is configured to adjustably support the support arm of the target mounting plate via an adjustment block.

In another aspect of the present disclosure, a machine includes a pair of rotatable members that are coupled to each other by an articulation joint. The machine also includes a sensor assembly that is associated with the articulation joint. The sensor assembly is configured to provide a signal indicative of position of the pair of rotatable members relative to each other. The sensor assembly has at least one sensor element and a target element. The machine also includes a mounting system for mounting the sensor assembly to the pair of rotatable members. The mounting system includes a sensor mounting plate for supporting the at least one sensor element thereon such that the at least one sensor element is in alignment with an axis of the articulation joint. The sensor mounting plate is coupled to a first rotatable member and disposed in a spaced apart manner from the articulation joint. The sensor mounting plate has a cut-out that is aligned with the axis of the articulation joint. Further, the sensor mounting plate has a set of first apertures that are spaced apart from the cut-out to correspond with a set of receptacles defined on the first rotatable member. Furthermore, the sensor mounting plate has a reference hole and a first centering hole that are located in a spaced-apart relation to the cut-out and the set of first apertures. The mounting system also includes a target mounting plate that is disposed in a spaced apart manner from the sensor mounting plate. The target mounting plate has a target mounting portion that is configured to support the target element thereon and a support arm extending from the target mounting portion. The target mounting portion has a first adjustment slot for adjustably corresponding with the reference hole of the sensor mounting plate and the support arm has a second centering hole for aligning with the first centering hole of the sensor mounting plate such that the target element is in alignment with the at least one sensor element and the axis of the articulation joint. The mounting system also includes a post that is located on a second rotatable member and disposed laterally with respect to the support arm of the target mounting plate. The post has a first end and a second end. The first end is configured to couple with the second rotatable member and the second end is configured to adjustably support the support arm of the target mounting plate via an adjustment block.

Other features and aspects of this disclosure will be apparent from the following description and the accompanying drawings.

DETAILED DESCRIPTION

Wherever possible, the same reference numbers will be used throughout the drawings to refer to the same or the like parts.

Figure 1:
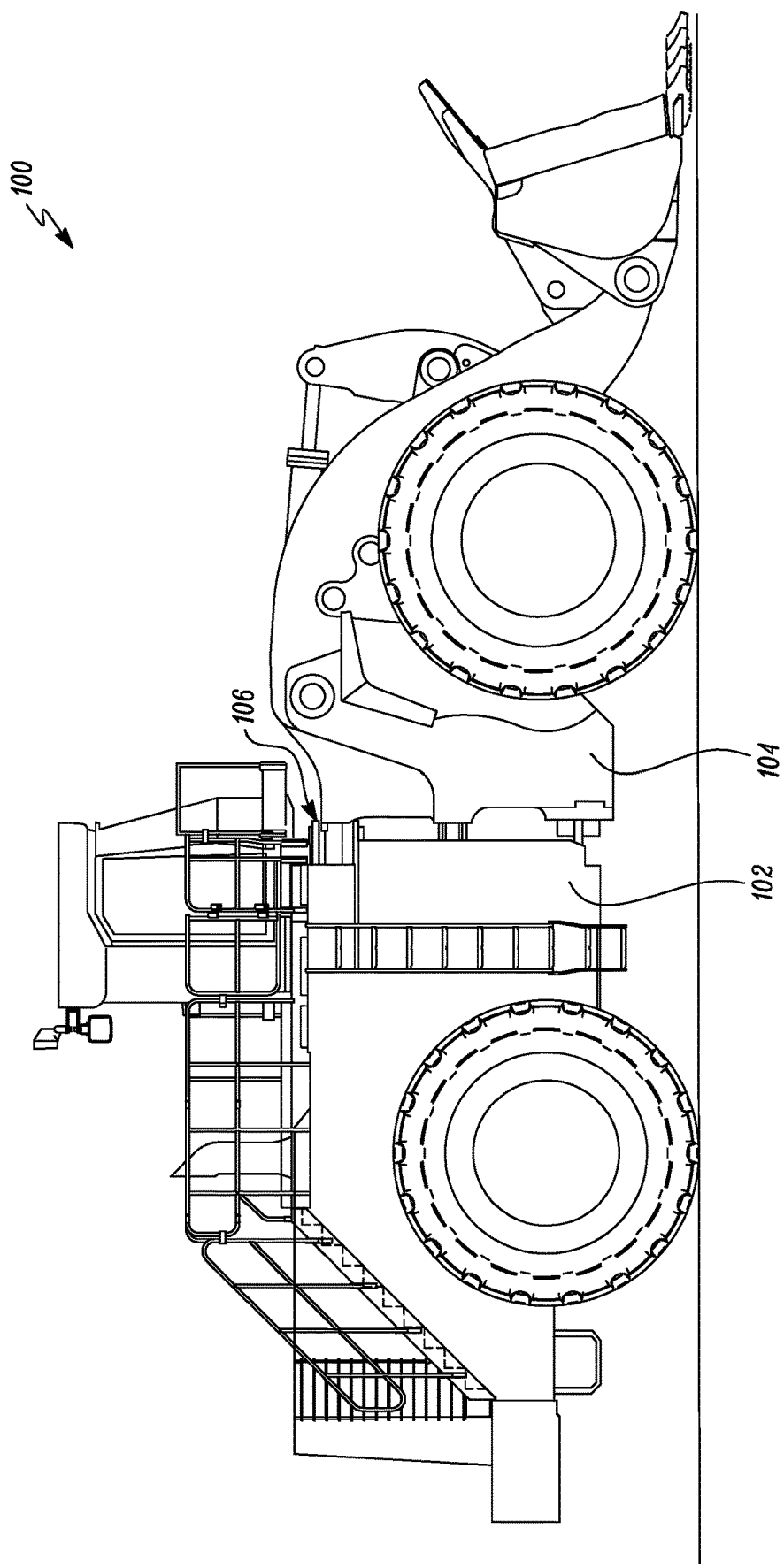
FIG. 1 is a side view of a machine showing a pair of rotatable members exemplarily embodied in the form of a front frame and a rear frame that are coupled by an articulation joint, according to an embodiment of the present disclosure.
Figure 2:
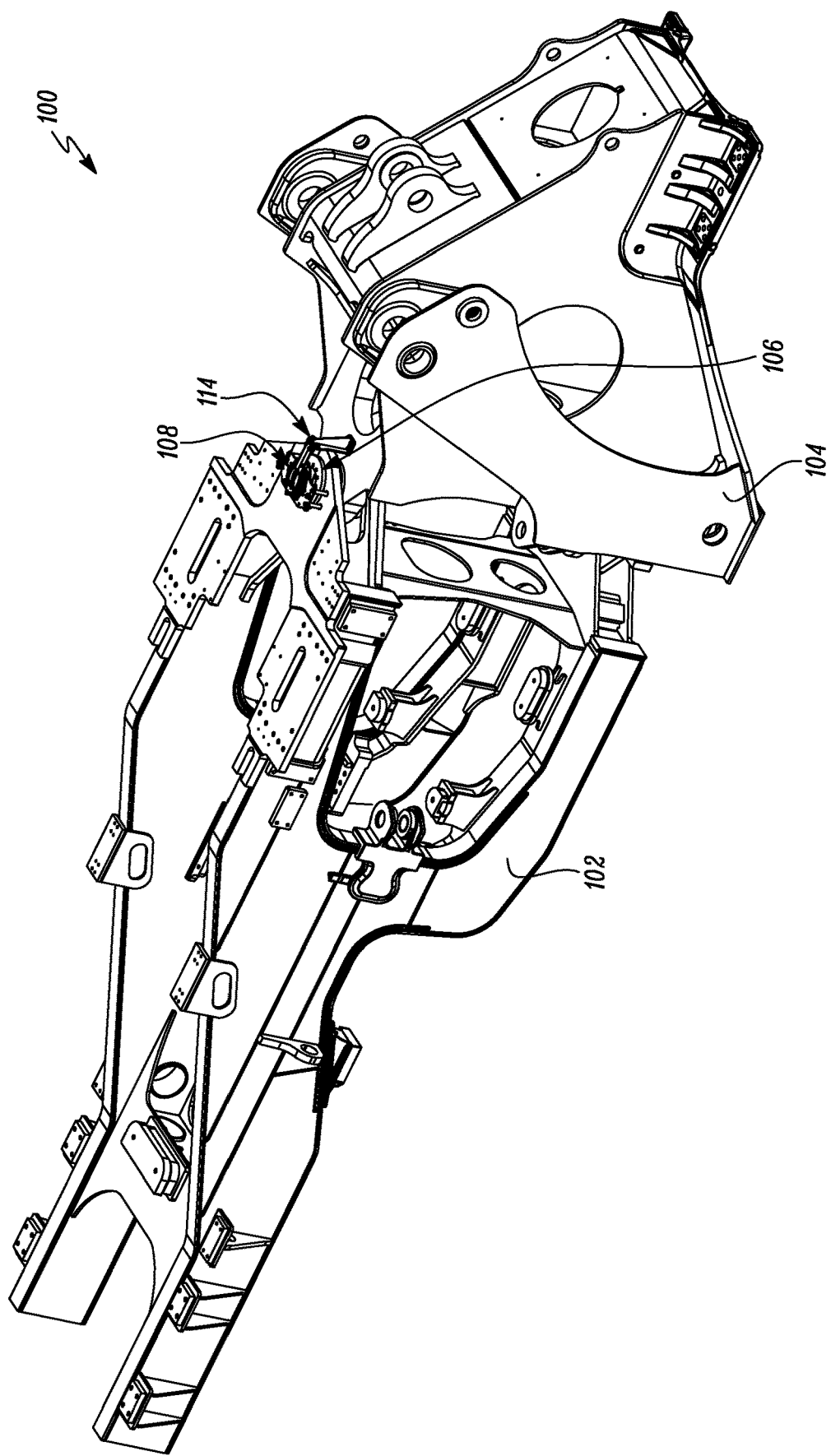
FIG. 2 is a top perspective view of the pair of rotatable members showing a sensor assembly and a mounting system for mounting the sensor assembly.

Referring to FIG. 1, an exemplary machine 100 is illustrated according to an embodiment of the present disclosure. As shown in the view of FIG. 1, the machine 100 is exemplarily embodied as a wheel loader. Further, as shown, the machine 100 includes a pair of rotatable members 102, 104 i.e., a rear frame and a front frame, respectively, that are coupled to each other by an articulation joint 106. Although a wheel loader is disclosed, it may be noted that a type of machine used is merely exemplary in nature and hence, non-limiting of this disclosure. In fact, upon reading the present disclosure, it will be appreciated by persons skilled in the art that the present disclosure can be similarly applied to other types of machines having a pair of rotatable members and an articulation joint coupling the pair of rotatable members. For sake of simplicity and wherever the context of the present disclosure so applies, the pair of rotatable members 102, 104 disclosed herein will be referred to as 'the first rotatable member' and 'the second rotatable member' and denoted using identical reference numerals '102' and '104' respectively.

Referring to FIGS. 2-5, the machine 100 also includes a sensor assembly 108 that is associated with the articulation joint 106. With regards to embodiments herein, the sensor assembly 108 is embodied as an articulation sensor assembly. That is, the sensor assembly 108 is configured to provide a signal indicative of an angular position of the pair of rotatable members 102, 104 relative to each other, or stated differently, a steering angle between the pair of rotatable members 102, 104. One example of such an articulation sensor assembly that works on the principle of anisotropic magnetic resonance (AMR) is commercially available under the trademark Honeywell R and such an articulation sensor assembly may be implemented for use in sensing the angular position, or the steering angle, of the first and second rotatable members 102, 104 relative to each other. However, it may be noted that the make, type, or model of the sensor assembly 108 is non-limiting of this disclosure. In alternative embodiments, sensor assemblies from other manufacturers may be implemented in lieu of that disclosed herein for realizing the present disclosure.

Figure 3:
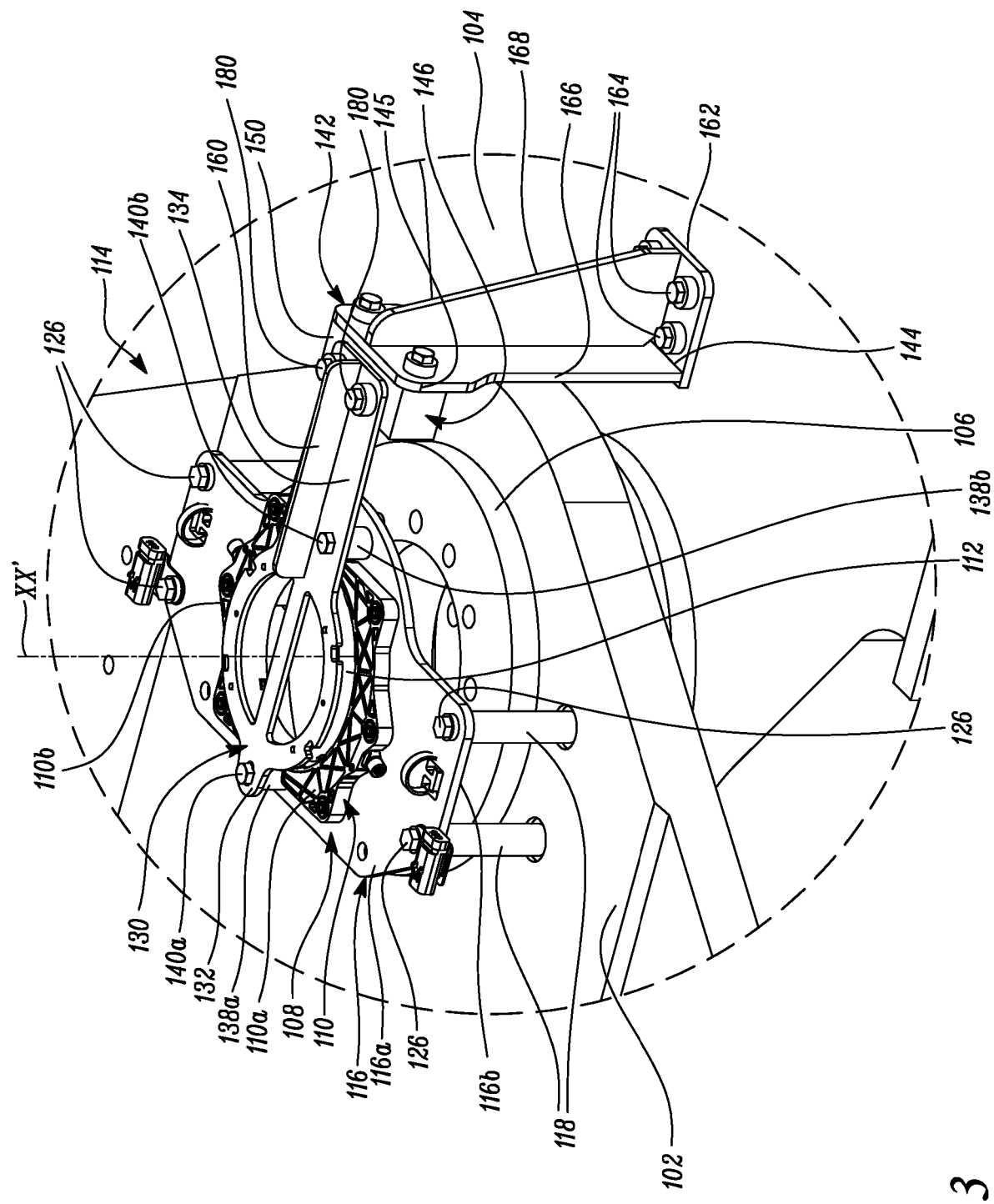
FIG. 3 is a zoomed-in top perspective view of the sensor assembly and the mounting system taken from the view of FIG. 2.
Figure 4:
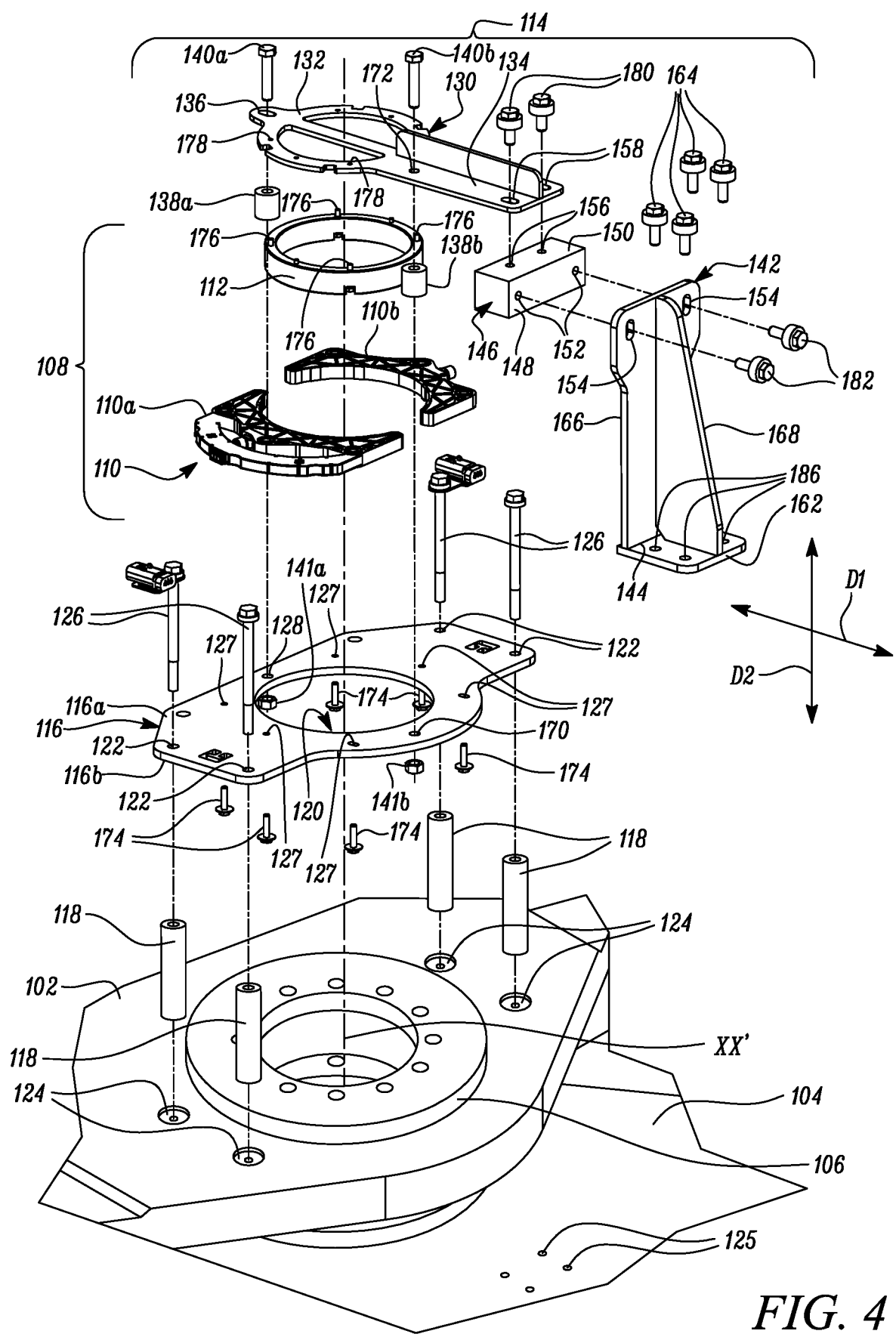
FIG. 4 is an exploded top perspective view of the sensor assembly and the mounting system.

As shown best in the views of FIGS. 3 and 4, the sensor assembly 108 has at least one sensor element 110 and a target element 112 therein. In the illustrated embodiment of FIGS. 3-4, the sensor assembly 108 includes a pair of sensor elements that are individually denoted by reference numerals 110a and 110b respectively. Although the present disclosure will be explained in conjunction with the pair of sensor elements 110a, 110b, in other embodiments, fewer or more sensor elements may be implemented for use in lieu of the pair of sensor elements 110a, 110b disclosed herein. Therefore, it will be acknowledged by persons skilled in the art that a number of sensor elements 110 used is non-limiting of this disclosure as the number of sensor elements 110 used may vary from one application to another.

With continued reference to FIGS. 3 and 4, a mounting system 114 is provided for mounting the sensor assembly 108 to the pair of rotatable members 102, 104. The mounting system 114 includes a sensor mounting plate 116 for supporting the pair of sensor elements 110a, 110b thereon such that the pair of sensor elements 110a, 110b is in alignment with an axis XX' of the articulation joint 106. The sensor assembly 108 may be provided with suitable fasteners 174, for example, a set of HEX bolt and nut arrangements in which the HEX bolts are axially received within corresponding holes 127 of the sensor mounting plate 116 from a first side 116a of the sensor mounting plate 116 and torqued to engage with corresponding nuts (not shown) located on, for example, molded with respective ones of the pair of sensor elements 110a, 110b for securing the pair of sensor elements 110a, 110b to the sensor mounting plate 116.

The sensor mounting plate 116 also has a cut-out 120 that is aligned with the axis XX' of the articulation joint 106. Further, the sensor mounting plate 116 has a set of first apertures 122 that are spaced apart from the cut-out 120 to correspond with a set of receptacles 124 defined on the first rotatable member 102. In an embodiment, the receptacles 124 that are defined on the first rotatable member 102 may be threaded receptacles. The sensor mounting plate 116 is disposed in a spaced apart manner from the articulation joint 106 and coupled to the first rotatable member 102. As shown best in the view of FIG. 5, the sensor mounting plate 116 is positioned at a first height H1 from the articulation joint 106 by a set of primary spacers 118. These primary spacers 118 are disposed about corresponding primary fasteners 126, for example, HEX bolts that are received within the set of first apertures 122 and engaged with the set of receptacles 124 on the first rotatable member 102.

In embodiments herein, the receptacles 124 on the first rotatable member 102 and the first apertures 122 and the holes 127 on the sensor mounting plate 116 are located such that upon receiving the primary fasteners 126 via the set of first apertures 122 to engage with the set of receptacles 124 and secure the sensor mounting plate 116 with the first rotatable member 102 and upon receiving the fasteners 174 within the holes 127 to secure the pair of sensor elements 110a, 110b to the sensor mounting plate 116, the pair of sensor elements 110a, 110b would be in alignment with the axis XX' of the articulation joint 106. Furthermore, as best shown in the view of FIG. 4, the sensor mounting plate 116 has a reference hole 128 and a first centering hole 170. The reference hole 128 and the first centering hole 170 are located in a spaced-apart relation to the cut-out 120 and the set of first apertures 122 respectively. Further explanation to the reference hole 128 and the first centering hole 170 will be made later herein.

Figure 5:
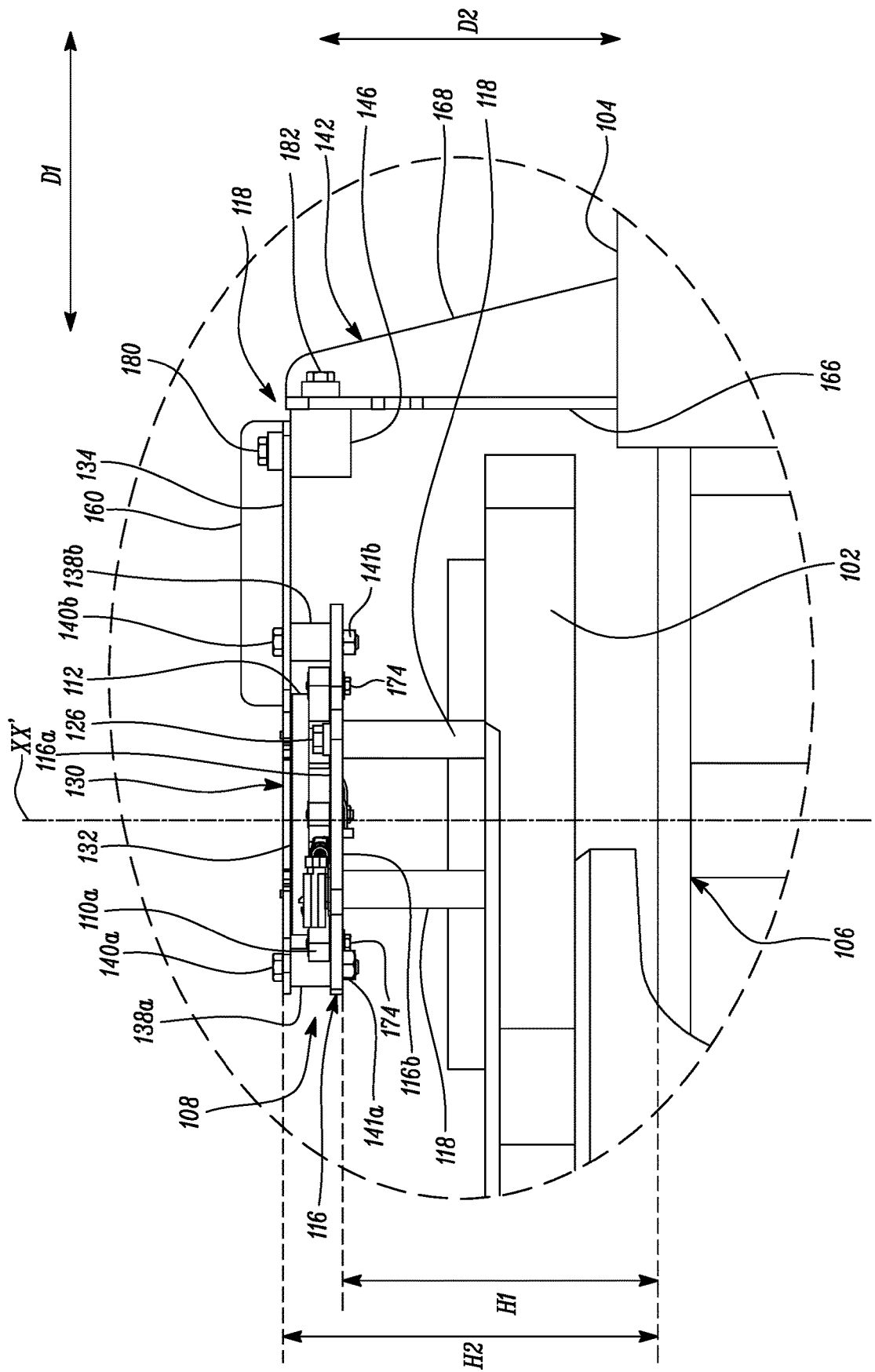
FIG. 5 is a zoomed-in side view of the pair of rotatable members showing the sensor assembly and the mounting system.

The mounting system 114 also includes a target mounting plate 130. As shown best in the view of FIG. 5, the target mounting plate 130 is disposed in a spaced apart manner from the sensor mounting plate 116. The target mounting plate 130 may be positioned at a second height H2 from the articulation joint 106. The second height H2 disclosed herein is greater than the first height H1. With continued reference to FIGS. 3-4 and as best shown in the view of FIG. 5, a pair of secondary spacers 138a, 138b may be disposed between the target mounting plate 130 and the sensor mounting plate 116 for positioning the target mounting plate 130 at the second height H2 with respect to the articulation joint 106.

The target mounting plate 130 has a target mounting portion 132 that is configured to support the target element 112 thereon. As shown best in the views of FIGS. 3 and 4, the target element 112 disclosed herein may be embodied as an annular ring that is made up of a suitable metal or alloy. Further, the target element 112 may be provided with suitable fasteners 176, for example, a set of HEX bolts. These fasteners 176 may be axially received within corresponding holes 178 on the target mounting portion 132 of the target mounting plate 130 for securing the target element 112 with the target mounting portion 132 of the target mounting plate 130.

In embodiments herein, although it is disclosed that the height H2 is greater than the height H1, it may be noted that the target mounting plate 130 is positioned such that the target element 112 is disposed facing the pair of sensor elements 110a, 110b. Therefore, in alternative embodiments, if the pair of sensor elements 110a, 110b are located on a second side 116b (see FIG. 5) of the sensor mounting plate 116, the target mounting plate 130 may be disposed below the sensor mounting plate 116 i.e., the target mounting plate 130 may be disposed at a height less than the first height H1 at which the sensor mounting plate 116 is positioned, all heights being measured from a common datum reference, in this case, the articulation joint 106.

Further, the target mounting plate 130 includes a support arm 134 that extends from the target mounting portion 132. Furthermore, the target mounting portion 132 has a first adjustment slot 136 for adjustably corresponding with the reference hole 128 of the sensor mounting plate 116 and the support arm 134 has a second centering hole 172 for aligning with the first centering hole 170 of the sensor mounting plate 116 such that the target element 112 is in alignment with the pair of sensor elements 110a, 110b and the axis XX' of the articulation joint 106.

With continued reference to FIGS. 3-5, a first one of the secondary spacers, i.e., the secondary spacer 138a is shown disposed about a corresponding secondary fastener 140a. This secondary fastener 140a is received within the first adjustment slot 136 and the reference hole 128 and engaged with a corresponding nut 141a that is located at the second side 116b of the sensor mounting plate 116 for facilitating an alignment of the first adjustment slot 136 with the reference hole 128. Further, a second one of the secondary spacers, i.e., the secondary spacer 138b is shown disposed about another corresponding secondary fastener 140b. This secondary fastener 140b is received within the first and second centering holes 170, 172 from respective ones of the sensor mounting plate 116 and the target mounting plate 130 and engaged with a corresponding nut 141b located at the second side 116b of the sensor mounting plate 116.

In embodiments herein, it may be noted that the locations of the first adjustment slot 136, the reference hole 128, the first centering hole 170 and the second centering hole 172 are selected such that upon inserting the secondary fastener 140a within the first adjustment slot 136 and the reference hole 128 and upon inserting the secondary fastener 140b within the set of aligned first and second centering holes 170, 172, the target element 112 would be in alignment with the pair of sensor elements 110a, 110b and the axis XX' of the articulation joint 106.

The mounting system 114 also includes a post 142 that is located on the second rotatable member 104 and disposed laterally with respect to the support arm 134 of the target mounting plate 130. The post 142 has a first end 144 and a second end 145. The first end 144 is configured to couple with the second rotatable member 104 and the second end 145 is configured to adjustably support the support arm 134 of the target mounting plate 130 via an adjustment block 146.

In embodiments herein, the adjustment block 146 may have a pair of mutually perpendicular sides 148, 150. Each side 148, 150 defines a pair of receptacles 152, 156 that are located in a spaced-apart manner from one another. In an embodiment, each of these receptacles 152, 156 may be threaded receptacles. The pair of receptacles 152 on the first side 148 of the adjustment block 146 may correspond with a pair of second adjustment slots 154 defined on the second end 145 of the post 142 for facilitating a displacement of the target mounting plate 130 along the axis XX' of the articulation joint 106 i.e., along a direction D2 as shown in the views of FIGS. 4-5. For coupling the adjustment block 146 to the second end 145 of the post 142, the mounting system 114 may be provided with suitable fasteners 182, for example, a set of HEX bolts that are axially received within the pair of second adjustment slots 154 of the post 142 and torqued to engage with corresponding ones of the receptacles 152 located on the first side 148 of the adjustment block 146.

Similarly, the pair of receptacles 156 on the second side 150 of the adjustment block 146 may correspond with a pair of third adjustment slots 158 defined on the support arm 134 for facilitating a displacement of the target mounting plate 130 laterally with respect to the axis XX' of the articulation joint 106 i.e., along a direction D1 as shown in the views of FIGS. 4-5. For coupling the adjustment block 146 to the support arm 134, the mounting system 114 may be provided with suitable fasteners 180, for example, a set of HEX bolts that are axially received within the pair of third adjustment slots 158 of the support arm 134 and torqued to engage with corresponding ones of the receptacles 156 located on the second side 150 of the adjustment block 146.

Moreover, it may be noted that the pair of secondary fasteners 140a, 140b and the pair of secondary spacers 138a, 138b may be removed upon positioning the target mounting plate 130 at the second height H2 from the articulation joint 106, aligning the target element 112 with the axis XX' of the articulation joint 106, and coupling the support arm 134 of the target mounting plate 130 to the second end 145 of the post 142 via the adjustment block 146. The removal of the pair of secondary fasteners 140a, 140b and the pair of secondary spacers 138a, 138b would facilitate the pair of rotatable members 102, 104 to rotate about the axis XX' of the articulation joint 106 during operation of the machine 100.

Further, in an embodiment herein, a first rib member 160 may be disposed transverse to the support arm 134 and affixed to the support arm 134. The first rib member 160 may be affixed to the support arm 134 by, for example, welding, and may be configured to reinforce the support arm 134 against any bending forces that may act on the support arm 134.

Furthermore, in an embodiment herein, the first end 144 of the post 142 may be configured to include a flange 162 that is coupled to the second rotatable member 104. The flange 162 may be coupled to the second rotatable member 104 using a set of mounting fasteners 164, for example, HEX bolts that are axially received within a corresponding set of holes 186 on the flange 162 and torqued to engage with a corresponding set of receptacles 125 defined on the second rotatable member 104. In an embodiment herein, the receptacles 125 may embody threaded receptacles. Moreover, the post 142 may include a support wall 166 that is affixed to the flange 162 and disposed in an upright manner with respect to the flange 162. Further, the post 142 may also include a second rib member 168 that may be disposed transverse to the support wall 166 and affixed to the support wall 166. The second rib member 168 may be configured to reinforce the support wall 166 against bending forces that may act on the support wall 166.

In embodiments herein, although it is disclosed that the sensor mounting plate 116 is coupled to the first rotatable member 102 and the target mounting plate 130 is coupled to the second rotatable member 104, it may be noted that such a configuration should not be construed as being limiting of this disclosure. In an alternative configuration, the sensor mounting plate may be coupled to the second rotatable member 104 while the target mounting plate may be coupled to the first rotatable member 102. Persons skilled in the art will appreciate that such alternative configurations may allow technicians to flexibly use the mounting system 114 for installing the sensor assembly 108 onto the pair of rotatable members 102, 104 that are coupled by the articulation joint 106.

Further, in embodiments herein, although the receptacles 124, 125, 152 and 156 are disclosed as threaded receptacles, and the term 'receptacles' has been used in this disclosure to refer to tapped holes i.e., internally defined threads that are configured to engage with corresponding fasteners 126, 164, 182 and 180, such a configuration of the receptacles 124, 125, 152 and 156 is non-limiting of this disclosure. In certain other embodiments, it can be contemplated to configure one or more of these receptacles 124, 125, 152 and 156 such that the receptacles 124, 125, 152 and/or 156 embody through-holes that can receive corresponding fasteners 126, 164, 182 and 180 from one end or side of respective ones of the through-holes while a complimenting structure to the fasteners, for example, HEX nuts (not shown) may be used to engage with, and secure, the ends of the corresponding fasteners 126, 164, 182 and 180 respectively from an opposite side of the through-holes. In yet other embodiments, a type of fastener used to embody each of the corresponding fasteners 126, 164, 182 and 180 may be also be modified. For instance, one or more of the fasteners 126, 164, 182 and/or 180 disclosed herein may be configured to embody a rivet, an Allen screw, a grub screw, or any other suitable fastener known to persons skilled in the art. Therefore, it should be noted that such variations in, and modifications to, the type of fasteners 126, 164, 182 and 180 used should be regarded as forming part of this disclosure and that such variations in, and modifications to the type of fasteners 126, 164, 182 and 180 can be contemplated for use in realizing embodiments herein without deviating from the spirit of the present disclosure.

Also, various embodiments disclosed herein are to be taken in the illustrative and explanatory sense and should in no way be construed as limiting of the present disclosure. All joinder references (e.g., associated, provided, connected, coupled and the like) and directional references (e.g., upper, lower, and the like) are only used to aid the reader's understanding of the present disclosure, and may not create limitations, particularly as to the position, orientation, or use of the components disclosed herein. Therefore, joinder references, if any, are to be construed broadly. Moreover, such joinder references do not necessarily infer that two elements are directly connected to each other.

Additionally, all numerical terms, such as, but not limited to, "first", "second", "primary", "secondary" or any other ordinary and/or numerical terms, should also be taken only as identifiers, to assist the reader's understanding of the various elements of the present disclosure, and may not create any limitations, particularly as to the order, or preference, of any element relative to or over another element.

INDUSTRIAL APPLICABILITY

The present disclosure has applicability for use in mounting a sensor assembly having at least one sensor element and a target element to a pair of rotatable members that are coupled by an articulating joint. With implementation of embodiments disclosed herein, technicians can easy and quickly position, for instance, the pair of sensor elements 110a, 110b and the target element 112 in alignment with the axis XX' of the articulating joint 106.

With use of the present disclosure, manufactures of machines can install, or retrofit, the sensor assembly 108 using the mounting system 114 disclosed herein. By providing the first rib member 160 and the second rib member 168 to the support arm 134 of the target mounting plate 130 and the support wall 166 of the post 142 respectively, the mounting system 114 of the present disclosure is configured to robustly support the target element 112 via the target mounting plate 130 while the target mounting plate 130 and the post 142 are reinforced by the first and second rib members 160, 168 against any bending loads thereon.

Further, the mounting system 114 of the present disclosure uses the alignment of the first adjustment slot 136 with the reference hole 128 and the alignment of the first and second centering holes 170, 172 for positioning the target element 112 in alignment with the pair of sensor elements 110a, 110b. Due to the alignment of the target element 112 with the pair of sensor elements 110a, 110b that are, previously installed and, in alignment with the axis XX', the target element 112 would also be positioned in alignment with the axis XX' of the articulation joint 106. The secondary fastener 140a and the fasteners 164, vis-à-vis the first and third adjustment slots 136, 154 of the target mounting plate 130 help facilitate adjustability in the bi-axial positioning of the target element 112 such that the target element 112 is in precise alignment with the axis XX' of the articulation joint 106. Due to an improved degree of precision in the alignment of the target element 112 with the axis XX' of the articulation joint 106, signals indicative of the articulation angle between the first and second rotatable members 102, 104 may be accurate and reliable for operators to use when the machine 100 is in operation.

While aspects of the present disclosure have been particularly shown and described with reference to the embodiments above, it will be understood by those skilled in the art that various additional embodiments may be contemplated by the modification of the disclosed machine 100 or the mounting system 114 without departing from the spirit and scope of the disclosure. Such embodiments should be understood to fall within the scope of the present disclosure as determined based upon the claims and any equivalents thereof

What is claimed is:

1. A mounting system for mounting a sensor assembly having a target element and at least one sensor element to a first rotatable member and a second rotatable members coupled by an articulation joint for relative rotational movement about an axis of the articulation joint, the mounting system comprising:
   a sensor mounting plate for supporting the at least one sensor element thereon such that at least one sensor element is in alignment with the axis of the articulation joint, the sensor mounting plate coupled to the first rotatable member and disposed in a spaced apart manner from the articulation joint, the sensor mounting plate having:
   a cut-out aligned with the axis of the articulation joint;
   a plurality of first apertures spaced apart from the cut-out to correspond with a plurality of receptacles defined on the first rotatable member; and
   a reference hole and a first centering hole located in a spaced-apart relation to the cut-out and the plurality of first apertures;
a plurality of first fasteners coupling the sensor mounting plate to the first rotatable member, wherein each of the plurality of first fasteners is inserted through a corresponding one of the plurality of first apertures of the sensor mounting plate and is received and engaged by a corresponding one of the plurality of receptacles of the first rotatable member;
a plurality of primary spacers, wherein each of the plurality of primary spacers is disposed around a corresponding one of the plurality of first fasteners and engages a second side of the sensor mounting plate and the first rotatable member to position the sensor mounting plate at a first height from the articulation joint;
a target mounting plate disposed in a spaced apart manner from the sensor mounting plate, the target mounting plate having a target mounting portion configured to support the target element thereon and a support arm extending from the target mounting portion, wherein the target mounting portion has a first adjustment slot adjustably corresponding with the reference hole of the sensor mounting plate and the support arm has a second centering hole for aligning with the first centering hole of the sensor mounting plate such that the target element is in alignment with the at least one sensor element and the axis of the articulation joint; and
a post located on the second rotatable member and disposed laterally with respect to the support arm of the target mounting plate, the post having a first end and a second end, wherein the first end is configured to couple with the second rotatable member and the second end is configured to adjustably support the support arm of the target mounting plate via an adjustment block.

2. The mounting system of claim 1, wherein the target mounting plate is positioned at a second height from the articulation joint by a pair of secondary spacers disposed between the target mounting plate and the sensor mounting plate, and wherein:
   a first one of the secondary spacers is disposed about a corresponding secondary fastener that is received within the first adjustment slot and the reference hole to facilitate an alignment of the first adjustment slot with the reference hole, and
   a second one of the secondary spacers is disposed about another corresponding secondary fastener that is received within the first and second centering holes from respective ones of the sensor mounting plate and the target mounting plate upon which the target element is in alignment with the articulation joint.

3. The mounting system of claim 2, wherein the pair of secondary spacers are configured for use in positioning the target mounting plate at the second height from the articulation joint and the pair of secondary fasteners are configured for use in positioning the target mounting plate via the pair of secondary spacers such that the target element is in alignment with the axis of the articulation joint.

4. The mounting system of claim 2, wherein the second height is greater than the first height.

5. The mounting system of claim 2, wherein the pair of secondary fasteners and the pair of secondary spacers are removed upon:
   positioning the target mounting plate at the second height from the articulation joint,
   aligning the target element with the axis of the articulation joint, and
   coupling the support arm of the target mounting plate to the second end of the post via the adjustment block.

6. The mounting system of claim 1 further comprising a first rib member disposed transverse to the support arm and affixed to the support arm, wherein the first rib member is configured to reinforce the support arm against bending forces acting on the support arm.

7. The mounting system of claim 1, wherein the first end of the post is configured to include a flange that is coupled to the second rotatable member using a plurality of mounting fasteners.

8. The mounting system of claim 7, wherein the post comprises:
   a support wall affixed to the flange and disposed in an upright manner with respect to the flange; and
   a second rib member disposed transverse to the support wall and affixed to the support wall, the second rib member configured to reinforce the support wall against bending forces acting on the support wall.

9. The mounting system of claim 1, wherein the adjustment block has a pair of mutually perpendicular sides, each side defining a pair of receptacles that are located in a spaced-apart manner from one another, and wherein:
   the pair of receptacles on a first side of the adjustment block corresponds with a pair of second adjustment slots defined on the second end of the post for displacing the target mounting plate along the axis of the articulation joint; and
   the pair of receptacles on a second side of the adjustment block correspond with a pair of third adjustment slots defined on the support arm for displacing the target mounting plate laterally with respect to the axis of the articulation joint.

10. A machine comprising:
   a first rotatable member and a second rotatable member coupled by an articulation joint for relative rotational movement about an axis of the articulation joint;
   a sensor assembly associated with the articulation joint and configured to provide a signal indicative of position of the first rotatable member and a second rotatable member relative to each other, the sensor assembly comprising at least one sensor element and a target element therein;
   a mounting system for mounting the sensor assembly to the first rotatable member and a second rotatable members, the mounting system comprising:
      a sensor mounting plate for supporting the at least one sensor element thereon such that the at least one sensor element is in alignment with the axis of the articulation joint, the sensor mounting plate coupled to the first rotatable member and disposed in a spaced apart manner from the articulation joint, the sensor mounting plate having:
         a cut-out aligned with the axis of the articulation joint;
         a plurality of first apertures spaced apart from the cut-out to correspond with a plurality of receptacles defined on the first rotatable member; and a reference hole and a first centering hole located in a spaced-apart relation to the cut-out and the plurality of first apertures;

a target mounting plate disposed in a spaced apart manner from the sensor mounting plate, the target mounting plate having a target mounting portion configured to support the target element thereon and a support arm extending from the target mounting portion, wherein the target mounting portion has a first adjustment slot adjustably corresponding with the reference hole of the sensor mounting plate and the support arm has a second centering hole for aligning with the first centering hole of the sensor mounting plate such that the target element is in alignment with the at least one sensor element and the axis of the articulation joint;

a post located on the second rotatable member and disposed laterally with respect to the support arm of the target mounting plate, the post having a first end and a second end, wherein the first end is coupled to the second rotatable member; and an adjustment block coupling the support arm of the target mounting plate to the second end of the post, wherein the second end of the post has a pair of second adjustment slots and the adjustment block has a corresponding first receptacles for displacing the target mounting plate along the axis of the articulation joint and adjusting a distance along the axis of the articulation joint between the at least one sensor element and the target element, and wherein the support arm has a pair of third adjustment slots and the adjustment block has a corresponding pair of second receptacles for displacing the target mounting plate perpendicular to the axis of the articulation to align the target element with the axis of the articulation joint.

11. The machine of claim 10, wherein the sensor mounting plate is positioned at a first height from the articulation joint by a plurality of primary spacers disposed about primary fasteners received within the plurality of first apertures and engaged with the plurality of receptacles on the first rotatable member.

12. The machine of claim 11, wherein the target mounting plate is positioned at a second height from the articulation joint by a pair of secondary spacers disposed between the target mounting plate and the sensor mounting plate, and wherein:

a first one of the secondary spacers is disposed about a corresponding secondary fastener that is received within the first adjustment slot and the reference hole to facilitate an alignment of the first adjustment slot with the reference hole, and a second one of the secondary spacers is disposed about another corresponding secondary fastener that is received within the first and second centering holes from respective ones of the sensor mounting plate and the target mounting plate upon which the target element is in alignment with the articulation joint.

13. The machine of claim 12, wherein the pair of secondary spacers is configured for use in positioning the target mounting plate at the second height from the articulation joint and the pair of secondary fasteners is configured for use in positioning the target mounting plate via the pair of secondary spacers such that the target element in alignment with the axis of the articulation joint.

14. The machine of claim 12, wherein the second height is greater than the first height.

15. The machine of claim 12, wherein the pair of secondary fasteners and the pair of secondary spacers are removed upon:
positioning the target mounting plate at the second height from the articulation joint,
aligning the target element with the axis of the articulation joint, and
coupling the support arm of the target mounting plate to the second end of the post via the adjustment block.

16. The machine of claim 10, wherein the mounting system further comprises a first rib member disposed transverse to the support arm and affixed to the support arm, the first rib member configured to reinforce the support arm against bending forces acting on the support arm.

17. The machine of claim 10, wherein the first end of the post is configured to include a flange that is coupled to the second rotatable member using a plurality of mounting fasteners.

18. The machine of claim 17, wherein the post comprises:
a support wall affixed to the flange and disposed in an upright manner with respect to the flange; and
a second rib member disposed transverse to the support wall and affixed to the support wall, the second rib member configured to reinforce the support wall against bending forces acting on the support wall.

19. The machine of claim 10, wherein the adjustment block has a first side having the first receptacles and a second side having the pair of second receptacles, wherein the first side and the second side are mutually perpendicular to each other.

* * * * *